(12) United States Patent
Haas et al.

(10) Patent No.: US 12,000,461 B2
(45) Date of Patent: Jun. 4, 2024

(54) POWERSHIFT TRANSMISSION OF A MOTOR VEHICLE

(71) Applicant: ZF Friedrichshafen AG, Friedrichshafen (DE)

(72) Inventors: Michael Haas, Hengersberg (DE); Martin Dankesreiter, Passau (DE); Anton Eder, Hutthurm (DE); Thomas Pauli, Passau (DE); Thomas Spießl, Hauzenberg (DE); Thomas Oberbuchner, Passau (DE); Stefan Igl, Vilshofen (DE); Simone Landshuter, Haidmühle (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 5 days.

(21) Appl. No.: 17/882,892

(22) Filed: Aug. 8, 2022

(65) Prior Publication Data

US 2023/0056250 A1 Feb. 23, 2023

(30) Foreign Application Priority Data

Aug. 17, 2021 (DE) ...................... 10 2021 208 975.5

(51) Int. Cl.
*F16H 3/00* (2006.01)
*F16H 3/093* (2006.01)

(52) U.S. Cl.
CPC ..... *F16H 3/006* (2013.01); *F16H 2003/0931* (2013.01)

(58) Field of Classification Search
CPC ........................ F16H 3/006; F16H 2003/0931
(Continued)

(56) References Cited

U.S. PATENT DOCUMENTS 5,053,961 A * 10/1991 Genise .................... F16H 59/02
701/52
5,272,939 A * 12/1993 Markyvech ............. F16H 59/14
477/120

(Continued)

FOREIGN PATENT DOCUMENTS

DE 10 2011 077 597 12/2012

OTHER PUBLICATIONS

German Patent Office, Search Report issued in German patent application No. 10 2021 208 975.5 (Jan. 31, 2022).

*Primary Examiner* — Ha Dinh Ho
(74) *Attorney, Agent, or Firm* — Finch & Maloney PLLC

(57) ABSTRACT

A powershift transmission of a motor vehicle has a split group with a plurality of powershift stages. An input shaft can be rotatably driven by a drive shaft of a motorized drive and transmits rotational movement in a stepped-up manner to an output shaft of the split group corresponding to one of several powershiftable stage transmissions. The powershiftable stage transmissions can be rotatably driven in a stepped-up manner by the output shaft of the split group via an intermediate group located therebetween, and via an input shaft of a synchromesh transmission group having a plurality of gear stages. A vehicle axle transmission can be rotatably driven by the output shaft of the synchromesh transmission group. The intermediate group has a multiple powershift intermediate transmission, in which each switching position the input shaft of the synchromesh transmission group can be rotatably driven by means of an associated transmission.

12 Claims, 3 Drawing Sheets

(58) Field of Classification Search
USPC ................................................. 74/330, 331
See application file for complete search history.

(56) References Cited

U.S. PATENT DOCUMENTS

| | | | | |
|---|---|---|---|---|
| 5,560,249 A | * | 10/1996 | Nellums | ................... F16H 3/12 |
| | | | | 477/3 |
| 2006/0021456 A1 | * | 2/2006 | Hughes | ................... B60K 6/40 |
| | | | | 74/330 |
| 2008/0053258 A1 | * | 3/2008 | Ohnemus | ............. F16H 3/0915 |
| | | | | 74/329 |

* cited by examiner

| VL | K1 + K2 |
|----|---------|
| VM | K3 + K2 |
| VH | K1 + K4 |
| VS | K3 + K4 |
| RL | K1 + K6 |
| RM | K3 + K6 |
| RH | K1 + K5 |
| RS | K3 + K5 |

Fig. 3

POWERSHIFT TRANSMISSION OF A MOTOR VEHICLE

RELATED APPLICATIONS

This application claims the benefit of and right of priority under 35 U.S.C. § 119 to German Patent Application no. 10 2021 208 975.5, filed on Aug. 17, 2021, the contents of which are incorporated herein by reference in its entirety.

SUMMARY

The invention relates to a powershift transmission of a motor vehicle having a split group which has a plurality of powershift stages and whose input shaft can be rotatably driven by a drive shaft of a motorized drive and transmits in a stepped up manner to an output shaft of the split group a rotational movement of a corresponding to a selection of one of several powershiftable stage transmissions, wherein can be rotatably driven in a stepped up manner and via an input shaft of a synchromesh transmission group which has a plurality of gear stages by the output shaft of the split group via an intermediate group located therebetween and an axle transmission of the motor vehicle can be rotatably driven by the output shaft of the synchromesh transmission group.

An object of the invention is therefore to provide a powershift transmission of a motor vehicle of the type mentioned in the introduction which with a simple structure has a high number of powershiftable gears in the overall transmission.

This object is achieved according to the invention by the intermediate group having a multiple powershift intermediate transmission, in each switching position of which the input shaft of the synchromesh transmission group can be rotatably driven by means of a transmission ratio which is associated therewith.

Preferably, the powershift transmission according to the invention is a powershift transmission for agricultural machines.

As a result of the powershift intermediate transmission, in a transmission of the type mentioned in the introduction the number of powershiftable gears in the overall transmission in which all the gears can be switched without any interruption of tensile force is multiplied in a simple manner.

An internal combustion engine, such as a diesel engine, is suitable as a motorized drive. However, any other suitable motorized drive can also be used.

In this instance, the split group may have one or more powershift forward stage transmissions whose number is multiplied by the intermediate transmission.

The split group may also have one or more powershift reverse stage transmissions whose number is multiplied by the intermediate gear.

In this instance, the clutches may be non-positive-locking clutches and/or frictionally engaging clutches.

The multiple powershift intermediate transmission may have a plurality of clutches which are each associated with a switching position of the multiple powershift intermediate transmission, wherein the clutches may be able to be switched, for example, in a manner operated in a manual or electrohydraulic manner.

In order to produce a hydraulic pressure for the electrohydraulic ability to switch, the input shaft may be able to be driven by means of a hydraulic pump by the drive shaft of the motorized drive so that no separate drive is required for the hydraulic pump.

A portion of the stage transmissions of the split group may be able to be rotatably driven directly by the drive shaft of the motorized drive via the input shaft of the split group and another portion of the stage transmissions of the split group may be able to be rotatably driven by the input shaft of the split group via a transmission.

It is further also possible that a portion of the forward stage transmissions of the split group may be able to be rotatably driven directly by the drive shaft of the motorized drive by means of a first input shaft of the split group and another portion of the forward stage transmissions of the split group may be able to be rotatably driven by the input shaft of the split group via a transmission, wherein a second input shaft of the powershift reverse stage transmissions of the split group can be rotatably driven by means of a second transmission by the drive shaft of the motorized drive.

BRIEF DESCRIPTION OF THE DRAWINGS

An embodiment of the invention is illustrated in the drawings and is described in greater detail below. In the drawings.

DETAILED DESCRIPTION

Figure 1:
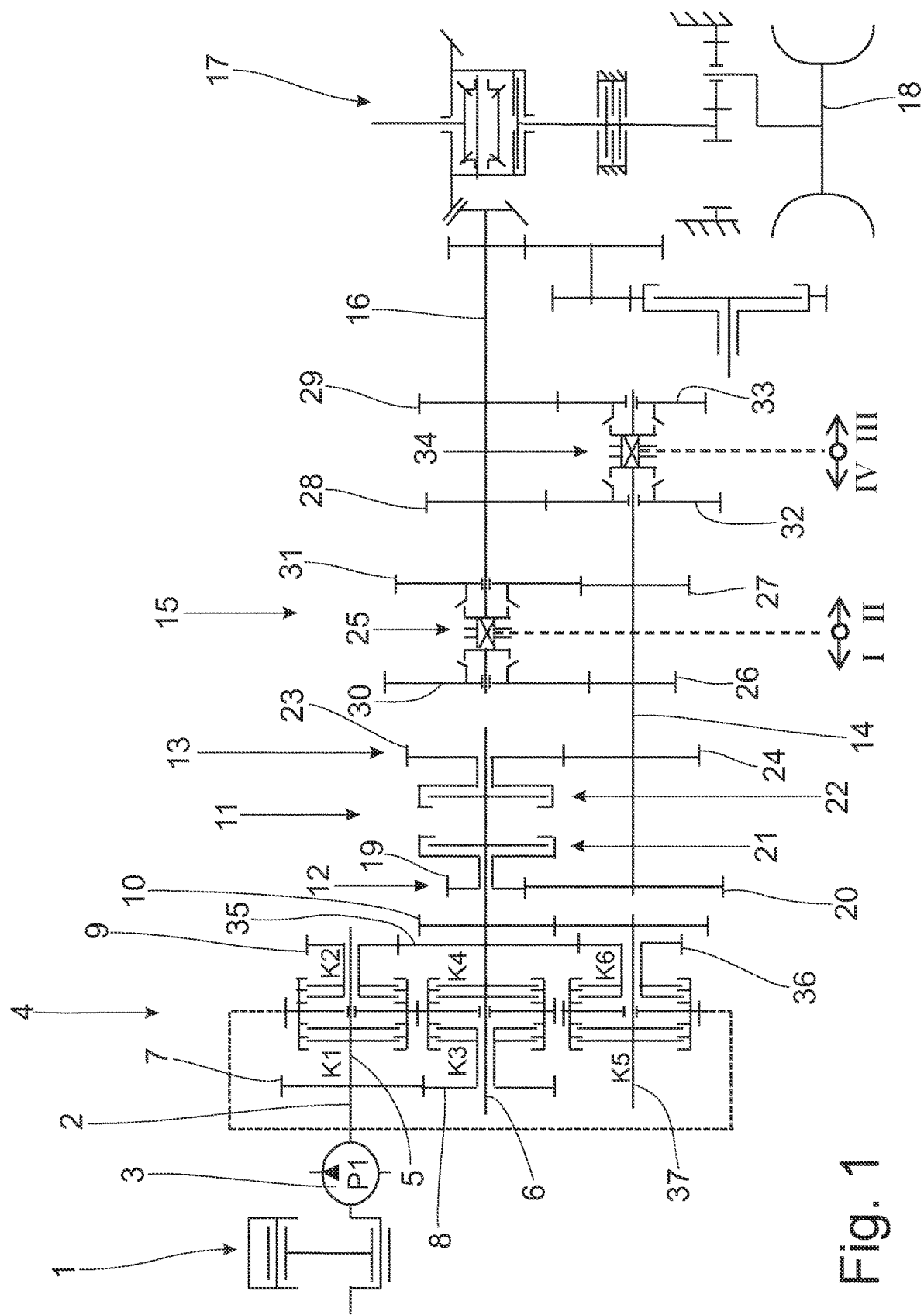
FIG. 1: shows a schematic illustration of a powershift transmission for motor vehicles.

The illustrated powershift transmission has an internal combustion engine as a motorized drive 1, by the drive shaft 2 of which an input shaft 5 of a split group 4 having a plurality of powershiftable stage transmissions is rotatably driven by means of a hydraulic pump 3.

The input shaft 5 carries a first fixed gear 7 which meshes with a first idler 8 which is rotatably supported on an output shaft 6 of the split group 4. The ninth fixed gear 35 engages in turn in a ninth idler 36 which is arranged so as to be able to be freely rotated on a shaft 37 of the split group 4.

On the input shaft 5, there is further arranged a second idler 9 which engages with a ninth fixed gear 35 which is arranged in a rotationally secure manner on the output shaft 6.

The intermediate group 11 which has two gear stages 12 and 13 is rotatably driven by the output shaft 6 of the split group 4 which forms an input shaft of an intermediate group 11.

A synchromesh transmission group 15 which has a plurality of gear stages each having an associated transmission is rotatably driven by the output shaft 14 of the intermediate group 11.

An axle 18 of the motor vehicle can be rotatably driven by the output shaft 16 of the synchromesh transmission 15 via an axle transmission 17.

Figure 2:
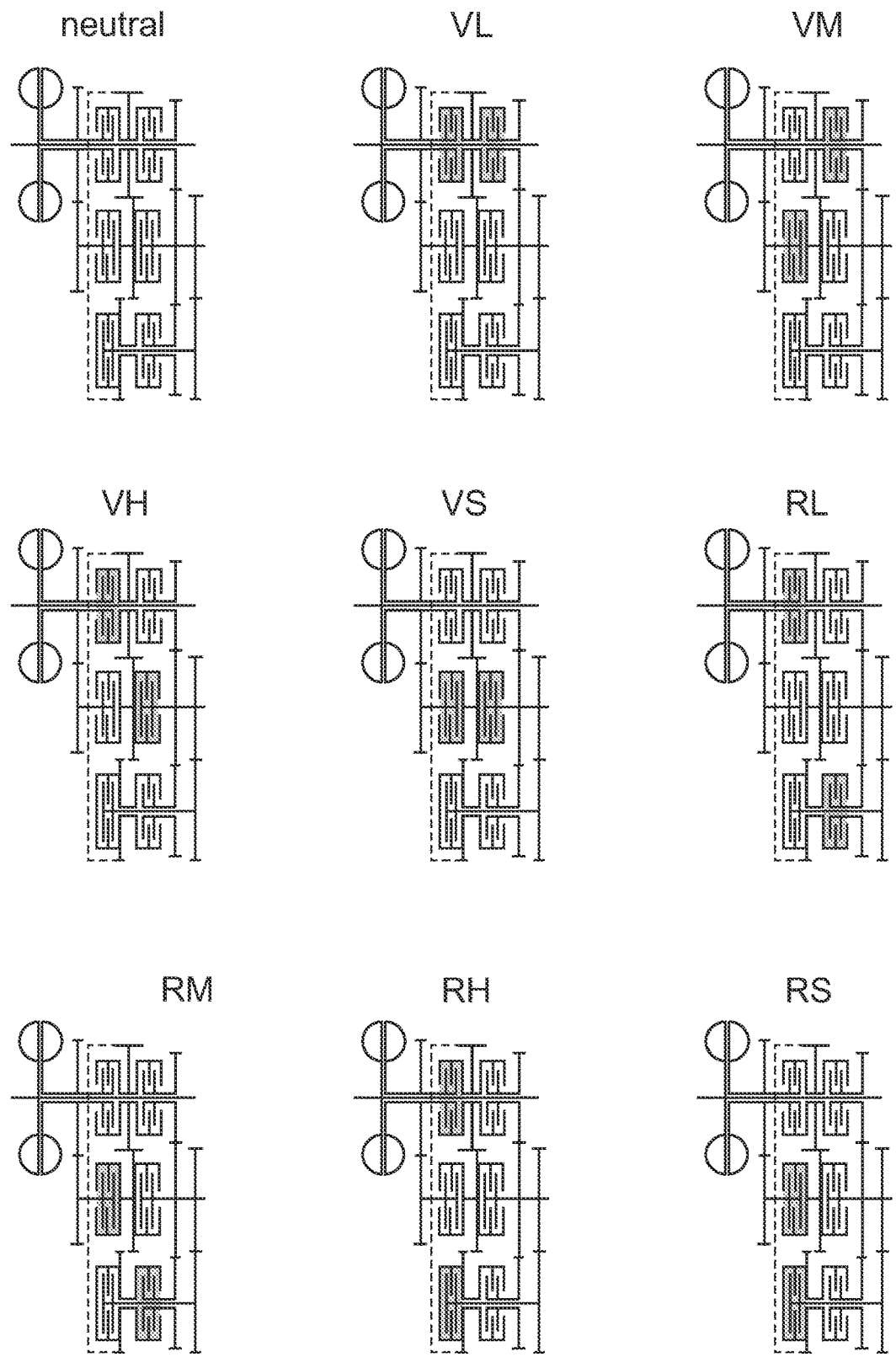
FIG. 2: shows an illustration of the clutch combinations of the split group of the powershift transmission according to FIG. 1, FIG. 3: shows a table of the clutch combinations of the split group of the powershift transmission according to FIG. 2.

The split group 4 has a neutral position, six clutches K1 to K6 having four powershift forward stage transmissions VL, VM, VH, VS and four powershift backward stage transmissions RL, RM, RH, RS whose respective switching combinations are illustrated with shading in FIG. 2.

In the neutral position, no clutch is closed.

In the forward stage transmission VL, the clutches K1 and K2 are coupled.

In the forward stage transmission VM, the clutches K3 and K2 are coupled.

In the forward stage transmission VH, the clutches K1 and K4 are coupled.

In the forward stage transmission VS, the clutches K3 and K4 are coupled.

In the reverse stage transmission RL, the clutches K1 and K6 are coupled.

In the reverse stage transmission RM, the clutches K3 and K6 are coupled.

In the reverse stage transmission RH, the clutches K1 and K5 are coupled.

In the reverse stage transmission RS, the clutches K3 and K5 are coupled.

The first gear stage 12 of the intermediate group 11 has a third idler 19 which is arranged so as to be able to be freely rotated on the output shaft 6 of the split group 4 and which meshes with a third fixed gear 20 which has a greater number of teeth than the number of teeth of the third idler 19 and which is fixedly arranged on the output shaft 14 of the intermediate group 11.

The intermediate group 11 has two powershift switching elements 21 and 22 which can be switched out of a neutral position.

When the first switching element 21 is activated, there is brought about a coupling of the output shaft 6 of the split group 4 with the output shaft 14 of the intermediate group 11 via the third idler 19 and the third fixed gear 20.

When the second switching element 22 is activated, there is brought about a coupling of a fourth idler 23 which is supported on the output shaft 6 so as to be able to be freely rotated with a fourth fixed gear 24 which is fixedly arranged on the output shaft 14 of the intermediate group 11, wherein the fourth fixed gear 24 may have more teeth than the fourth idler 23.

The powershiftable stage transmissions which can be represented by the split group 4 can consequently be doubled by the intermediate group 11.

The synchromesh transmission 15 has four gear stages I to VI.

In this instance, each of the gear stages I to IV has a fixed gear 26 to 29 which is in toothed engagement with an idler 30 to 33 in each case.

In the gear stages I and II, the fixed gears 26 and 27 are arranged in a rotationally secure manner on the output shaft 14 of the intermediate group 11, whilst, in the gear stages III and IV, the fixed gears 28 and 29 are arranged in a rotationally secure manner on the output shaft 16 of the synchromesh transmission 15.

In the gear stages I and II, the idlers 30 and 31 are arranged so as to freely rotate on the output shaft 16 of the synchromesh group 15, whilst, in the gear stages III and IV, the idlers 32 and 33 are arranged so as to be able to be freely rotated on the output shaft 14 of the intermediate group 11.

As a result of a first dual synchronous clutch 25 of the synchromesh transmission 15, in the first gear stage I the output shaft 14 is coupled via the fifth fixed gear 26 and the fifth idler 30 to the output shaft 16 and in the second gear stage II is coupled via the sixth fixed gear 27 and the sixth idler 31 to the output shaft 16.

As a result of a second dual synchronous clutch 34 of the synchromesh transmission 15, in the third gear stage III the output shaft 14 is coupled via the eighth idler 33 and the eighth fixed gear 29 to the output shaft 16 and in the fourth gear stage IV is coupled via the seventh idler 28 ad the seventh fixed gear 32 to the output shaft 16.

As a result of this construction, in a simple manner a total of thirty two forward gears and thirty two reverse gears can be achieved.

Depending on the selection of the split group and the synchromesh transmission, as a result of an intermediate group which is selected in each case a significant increase of the forward gears and reverse gears can be achieved.

It is thus possible, for example, with another powershift transmission which is not illustrated having a split group of six forward gears and three reverse gears, and a two-stage intermediate group and a three-stage synchromesh transmission in a simple manner for a number of thirty six forward gears and eighteen reverse gears to be achieved.

LIST OF REFERENCE NUMERALS

1 Motorized drive
2 Drive shaft
3 Hydraulic pump
4 Split group
5 Input shaft split group
6 Output shaft split group
7 First fixed gear
8 First idler
9 Second idler
10 Second fixed gear
11 Intermediate group
12 First gear stage
13 Second gear stage
14 Output shaft of intermediate group
15 Synchromesh transmission group
16 Output shaft of synchromesh transmission group
17 Axle transmission
18 Axle
19 Third idler
20 Third fixed gear
21 First switching element
22 Second switching element
23 Fourth idler
24 Fourth fixed gear
25 First dual synchronous clutch
26 Fifth fixed gear
27 Sixth fixed gear
28 Seventh fixed gear
29 Eighth fixed gear
30 Fifth idler
31 Sixth idler
32 Seventh idler
33 Eighth idler
34 Second dual synchronous clutch
35 Ninth fixed gear
36 Ninth idler
37 Shaft

The invention claimed is:

1. A powershift transmission of a motor vehicle having a motorized drive, the powershift transmission comprising:
a split group with a plurality of powershift stages, an input shaft, and an output shaft, the input shaft configured to be rotatably driven by a drive shaft of the motorized drive, wherein the split group transmits rotational movement in a stepped-up manner to the output shaft of the split group, the rotational movement corresponding to one of the plurality of powershift stages;
a synchromesh transmission group having a plurality of gear stages, an input shaft, and an output shaft;
an intermediate group having an output shaft and an input shaft, the intermediate group positioned between the synchromesh transmission group and the split group, wherein the synchromesh transmission group is configured to be rotatably driven in a stepped up manner by the output shaft of the intermediate group, the output shaft of the intermediate group is parallel to the input shaft of the intermediate group;

an axle transmission configured to be rotatably driven by the output shaft of the synchromesh transmission group; and wherein the intermediate group has a multiple powershift intermediate transmission, and in each switching position, the input shaft of the synchromesh transmission group can be rotatably driven by an associated transmission of the multiple powershift intermediate transmission.

2. The powershift transmission of claim 1, wherein the split group has one or more powershift forward stage transmissions.

3. The powershift transmission of claim 2, wherein the split group has one or more powershift reverse stage transmissions.

4. The powershift transmission of claim 1, wherein the split group has one or more powershift reverse stage transmissions.

5. The powershift transmission of claim 1, wherein the multiple powershift intermediate transmission has a plurality of clutches which are in each case associated with a switching position of the multiple powershift intermediate transmission.

6. The powershift transmission of claim 5, wherein the clutches are non-positive-locking clutches and/or frictionally engaging clutches.

7. The powershift transmission of claim 1, wherein a portion of the plurality of powershift stages of the split group can be rotatably driven directly by the drive shaft of the motorized drive via the input shaft of the split group, and another portion of the plurality of powershift stages of the split group can be rotatably driven by the input shaft of the split group via a transmission.

8. The powershift transmission of claim 3, wherein a portion of the plurality of powershift stages of the split group can be rotatably driven directly by the drive shaft of the motorized drive via the input shaft of the split group, and another portion of the plurality of powershift stages of the split group can be rotatably driven by the input shaft of the split group via a transmission.

9. The powershift transmission of claim 8, wherein a portion of the powershift forward stage transmissions of the split group can be rotatably driven directly by the drive shaft of the motorized drive by means of a first input shaft of the split group and another portion of the powershift forward stage transmissions of the split group can be rotatably driven by the input shaft of the split group via the transmission, and wherein a second input shaft of the powershift reverse stage transmissions of the split group can be rotatably driven by means of a second transmission by the drive shaft of the motorized drive.

10. The powershift transmission of claim 1, wherein the intermediate group has two gear stages, and each of the two gear stages of the intermediate group has an idler gear that is supported on- and rotatable with respect to the input shaft of the intermediate group.

11. The powershift transmission of claim 1, wherein the intermediate group has two gear stages, and each of the two gear stages of the intermediate group has a fixed gear that is fixed to the output shaft of the intermediate group such that each of the fixed gears rotates in unison with the output shaft of the intermediate group.

12. The powershift transmission of claim 1, wherein the intermediate group has first and second gear stages and first and second switching elements, wherein engagement of the first switching element drivably couples the input and the output shafts of the intermediate group to each other via only the first gear stage, and wherein engagement of the second switching element drivably couples the input and the output shafts of the intermediate group to each other via only the second gear stage.

\* \* \* \* \*